United States Patent [19]
Sakai

[11] Patent Number: 5,959,971
[45] Date of Patent: Sep. 28, 1999

[54] PROTECTION SWITCHING SYSTEM FOR CELLULAR CONTROL SIGNALS

[75] Inventor: Kazuaki Sakai, Tokyo, Japan

[73] Assignee: NEC Corporation, Tokyo, Japan

[21] Appl. No.: 08/703,957

[22] Filed: Aug. 28, 1996

[30] Foreign Application Priority Data

Aug. 28, 1995 [JP] Japan ............................... 7-218700

[51] Int. Cl.⁶ .................. H04L 12/50; H04Q 11/00
[52] U.S. Cl. .................. 370/228; 370/248; 370/336; 370/362; 370/375; 370/378; 370/509; 370/522; 455/511
[58] Field of Search ........................ 370/216, 225–228, 370/242–245, 248, 328, 329, 331, 336, 338, 345, 347, 349, 350, 362, 375, 376, 378, 509, 514, 522; 455/507, 509, 511, 514, 515

[56] References Cited

U.S. PATENT DOCUMENTS

| | | | |
|---|---|---|---|
| 4,545,049 | 10/1985 | Krammerer et al. | 370/225 |
| 4,884,263 | 11/1989 | Suzuki | 370/225 |
| 5,398,236 | 3/1995 | Hemmady et al. | 370/218 |
| 5,648,962 | 7/1997 | Pirinen | 370/338 |

*Primary Examiner*—Douglas W. Olms
*Assistant Examiner*—Seema S. Rao
*Attorney, Agent, or Firm*—Foley & Lardner

[57] ABSTRACT

In a base station controller of a cellular communication system, a center-to-base time-division multiplexed (TDM) signal from a mobile switching center is demultiplexed into multiple downlink TDM signals and forwarded via transmission lines to a cell-site base station and multiple uplink TDM signals from the base station are multiplexed into a base-to-center TDM signal and transmitted to the mobile switching center. One of the downlink TDM signals contains downlink cellular control data and one of the uplink TDM signals contains uplink cellular control data. In the base station, the downlink TDM signals are multiplexed into a base-to-mobile TDM signal for transmission to mobile stations and a mobile-to-base TDM signal is demultiplexed into multiple uplink TDM signals and transmitted to the base station controller. The base station controller and the cell-site base station monitor the transmission lines to detect a failure and, upon detection of the failure, provides protection switching of the downlink cellular control data to a vacant time slot of another downlink TDM signal and protection switching of the uplink cellular control data to a vacant time slot of another uplink TDM signal.

20 Claims, 8 Drawing Sheets

MULTIPLEXER 34

5,959,971

1

PROTECTION SWITCHING SYSTEM FOR CELLULAR CONTROL SIGNALS

BACKGROUND OF THE INVENTION

1. Field of the Invention

The present invention relates generally to cellular communication systems, and more specifically to cellular control signals transmitted between a base station controller and a cell-site base station.

2. Description of the Related Art

In a cellular communication system, a base station controller is connected to a cell-site base station via a plurality of transmission lines and cellular control signals are multiplexed onto a specified one of the transmission lines and transmitted with payload signals in a multiplex format. Such control signals include a maintenance signal designated "embedded operations channel (EOC)" and a mobile control signal designated "system broadcast channel (SBC)". However, no protection switching is provided for the transmission lines. If a failure occurs in such a specified transmission line, the cellular control signals will be lost, resulting in an outage of the whole system.

SUMMARY OF THE INVENTION

It is therefore an object of the present invention to provide protection switching of cellular control signals.

According to a broader aspect of the present invention, there is provided a cellular communication system comprising a base station controller and a cell-site base station. The base station controller transmits a plurality of downlink TDM signals through a plurality of two-way transmission lines and receiving a plurality of uplink TDM signals from the transmission lines, one of the downlink TDM signals containing downlink cellular control data and one of the uplink TDM signals containing uplink cellular control data. The base station controller monitors the transmission lines to detect a failure and, upon detection of the failure, provides protection switching of the downlink cellular control data to a vacant time slot of another downlink TDM signal and protection switching of the uplink cellular control data to a vacant time slot of another uplink TDM signal. The cell-site base station receives the downlink TDM signals from the transmission lines and transmits the plurality of uplink TDM signals to the transmission lines. The base station monitors the transmission lines to detect a failure and, upon detection of the failure, provides protection switching of the downlink cellular control data to the vacant time slot of the another downlink TDM signal and protection switching of the uplink cellular control data to the vacant time slot of the another uplink TDM signal.

According to a specific aspect, the cellular communication system of the present invention comprises a cell-site base station for establishing radio communication with a plurality of mobile stations, and a base station controller connected to the base station via a plurality of two-way transmission lines, the base station controller including a demultiplexer for demultiplexing a center-to-base time-division multiplexed (TDM) signal from a mobile switching center and forwarding a plurality of downlink TDM signals to the transmission lines and a multiplexer for multiplexing a plurality of uplink TDM signals from the transmission lines and forwarding a base-to-center TDM signal to the mobile switching center, one of the downlink TDM signals containing downlink cellular control data and one of the uplink TDM signals containing uplink cellular control data.

2

The base station includes a multiplexer for multiplexing the downlink TDM signals into a base-to-mobile TDM signal for transmission to the mobile stations and demultiplexer for demultiplexing a mobile-to-base TDM signal from the mobile stations and forwarding a plurality of uplink TDM signals to the transmission lines. The base station controller further includes means for monitoring the transmission lines to detect a failure and, upon detection of the failure, causing the demultiplexer and multiplexer of the base station controller to provide protection switching of the downlink cellular control data to a vacant time slot of another downlink TDM signal and protection switching of the uplink cellular control data to a vacant time slot of another uplink TDM signal. The base station further includes means for monitoring the transmission lines to detect a failure and, upon detection of the failure, causing the demultiplexer and multiplexer of the base station to provide protection switching of the downlink cellular control data to the vacant time slot of the another downlink TDM signal and protection switching of the uplink cellular control data to the vacant time slot of the another uplink TDM signal.

BRIEF DESCRIPTION OF THE DRAWINGS

The present invention will be described in further detail with reference to the accompanying drawings, in which.

DETAILED DESCRIPTION

Figure 1:
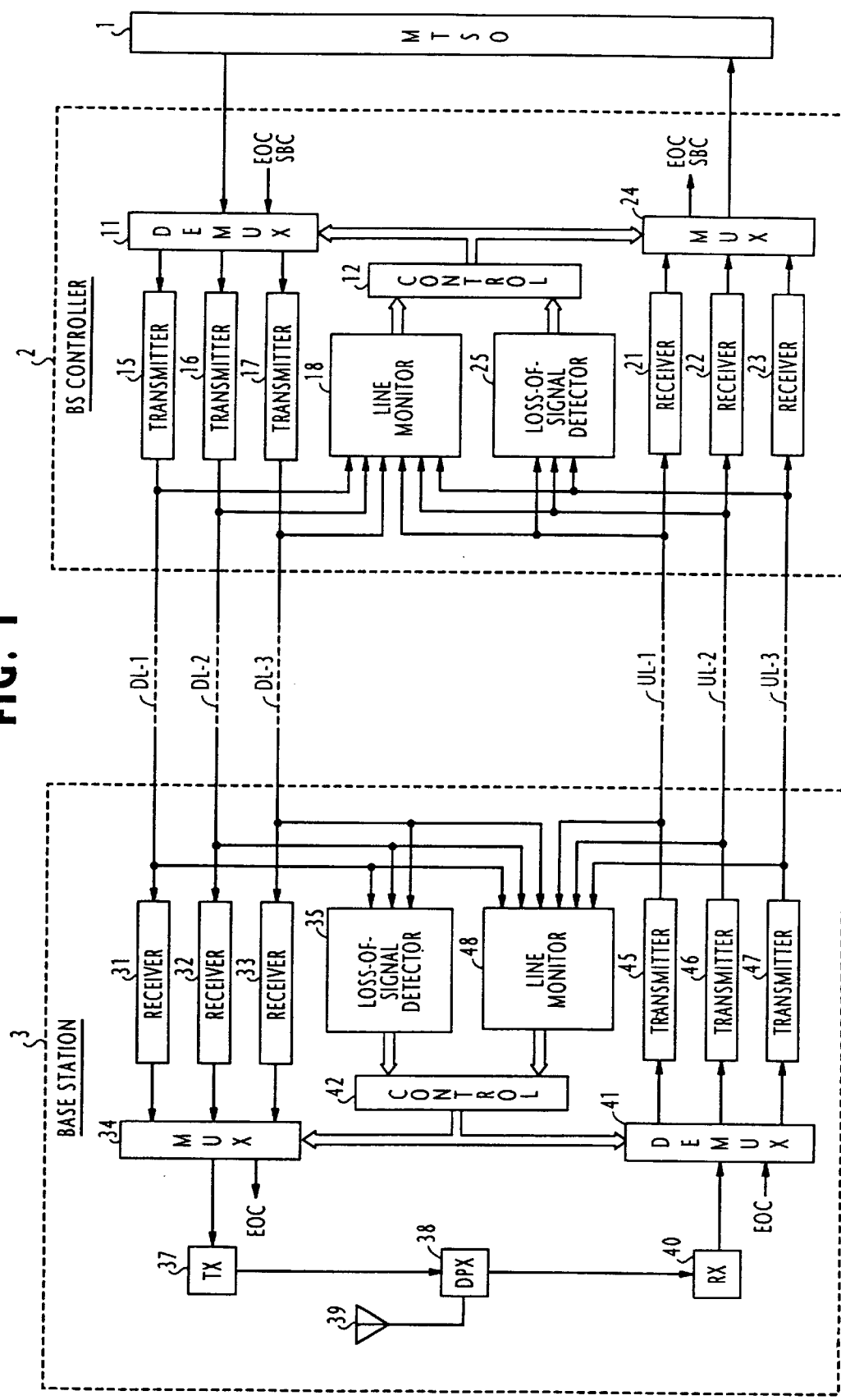
FIG. 1 is a block diagram of a base station and a base station controller according to the present invention.

In FIG. 1, there is shown a protection switching system of the present invention for switching control signals carried on transmission lines between a base station controller (BSC) 2 and a base station (BS) 3 of a cellular mobile communication system when a failure occurs in at least one of the transmission lines.

Base station controller 2 includes a time-division demultiplexer 11 for demultiplexing a sequence of payload bits from a conventional mobile telephone switching office 1 into three output sequences, for example, which are respectively applied to line transmitters 15, 16 and 17. An embedded operations channel (EOC) containing a maintenance signal and a system broadcast channel (SBC) containing a mobile control signal are combined with one of the demultiplexed sequences by the demultiplexer 11. Usually, the EOC and SBC control signals are multiplexed with one of the input signals of transmitters 15 to 17. Usually, they are multiplexed with the input signal of transmitter 15. The input signals of the transmitters 15 to 17 are encoded according to a specified line format for error detection and correction and amplified for transmission. The output signals of the line transmitters 15 to 17 are coupled respectively to downlink transmission lines DL-1, DL-2 and DL-3 and transmitted to the base station 3.

At the base station 3, transmission lines DL-1, DL-2 and DL-3 are respectively terminated at receivers 31, 32 and 33 where the transmitted signals are amplified and decoded. The outputs of receivers 31, 32 and 33 are applied to a multiplexer 34 where the payload signals and the SBC signal are time-division multiplexed onto specified time slots of a single data sequence and applied to a radio transmitter 37, while the EOC signal is extracted and delivered to an external circuit, not shown, for utilization. The multiplexed data sequence is modulated onto a radio frequency carrier as a downlink channel and transmitted to mobile stations via diplexer 38 and antenna 39.

In a similar manner, mobile-to-base signals and an SBC signal are time-division multiplexed on an uplink access channel and a radio receiver 40 at the base station 3 receives it via antenna 39 and diplexer 38 and converts the signals to baseband signals and applied to a time-division demultiplexer 41. Demultiplexer 41 decomposes the received payload bits into three output sequences and multiplexes the SBC signal and an EOC signal originated at the base station 3 into one of these output sequences. The outputs of demultiplexer 41 are respectively coupled to transmitters 45, 46, and 47 for line-code conversion and amplification and transmitted through uplink transmission lines UP-1, UP-2 and UP3.

At the base station controller 2, the mobile-to-base uplink signals are respectively amplified and decoded by receivers 21, 22, 23 and applied to a multiplexer 24, where the EOC and SBC signals are extracted and the payload signals are multiplexed and transmitted to the MTSO.

At the base station controller 2, the payload bits supplied in sequence to demultiplexer 11 are autonomously demultiplexed into respective output sequences. Therefore, the failure of a transmission line simply results in the loss of payload bits in those time slots of the downlink radio channel which are associated with the failed line.

However, according to the present invention, the base station controller 2 is provided with a line monitor 18 for monitoring both downlink and uplink transmission lines for detecting failures and availability of time slots and a loss-of-signal detector 25 for detecting a loss of control signals (EOC and SBC) in the uplink transmission lines. The outputs of fault detector 18 and loss-of-signal detector 25 are used by a line controller 12 to control demultiplexer 11 and multiplexer 24 for effecting protection switching of the control signals on the BS controller side of the transmission links. In the same way, the base station 3 is provided with a loss-of-signal detector 35 for detecting a loss of control signals in the downlink lines and a line monitor 48 for monitoring both of the downlink and uplink lines detecting a failure and availability of time slots. The outputs of detectors 35 and 48 are used by a line controller 42 to control demultiplexer 41 and multiplexer 34 for effecting protection switching of the control signals on the base station side of the transmission links.

When a failure occurs in the line DL-1, both of the line monitors 18 and 48 will detect it and effect protection switching of the control signals to available time slots. If the nature of a fault is such that only the line monitor 18 senses this fault, protection switching occurs only at the base station controller. In such instances, a loss of signal occurs in line DL-1 at the base station in the time slots of the faulty line due to the protection switching at the base station controller and the loss-of-signal detector 35 will detect it to complete the protection switching at the base station side of the link.

Figure 2A:
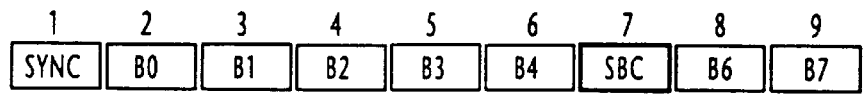
FIGS. 2A to 2C are illustrations of data formats used in the air interface and line interface of the system.

As shown in FIG. 2A, each transmission link (line interface) has five time slots with slot #1 carrying a sync word (SW). During normal conditions, line 1 carries payload bits B0, B2, and control bits SBC and EOC in slots #2 to #5, respectively, and line 2 carries payload bits B1, B3 and B6 in slots #2 to #4, respectively. The time slot #5 of line 2 carries no signal and is reserved for future use. Line 3 carries payload bits B4 and B7 in the #2 and #3 time slots, respectively, leaving slots #4 and #5 as reserved for future use. These signals are multiplexed at the base station 3 and carried on a radio frequency frame (air interface) carrying a sync word in slot #1, payload bits B0 to B4 in slots #2 to #6, the SBC bits in slot #7 and payload bits B6 and B7 in slots #8 and #9.

The operation of the controllers 12 and 42 associated with the output of line monitors 18 and 48 will be described with reference to the flowchart of FIG. 3 and the operation of these controllers associated with the output of loss-of-signal detectors 25 and 35 will be described with reference to FIG. 4. For convenience, the transmission lines of both downlink and uplink are designated simply as lines 1, 2 and 3 since they carry the same signals of opposite directions. Since both controllers 12 and 42 are identical, the description of FIGS. 3 and 4 will proceed with reference to controller 12.

Figure 3:
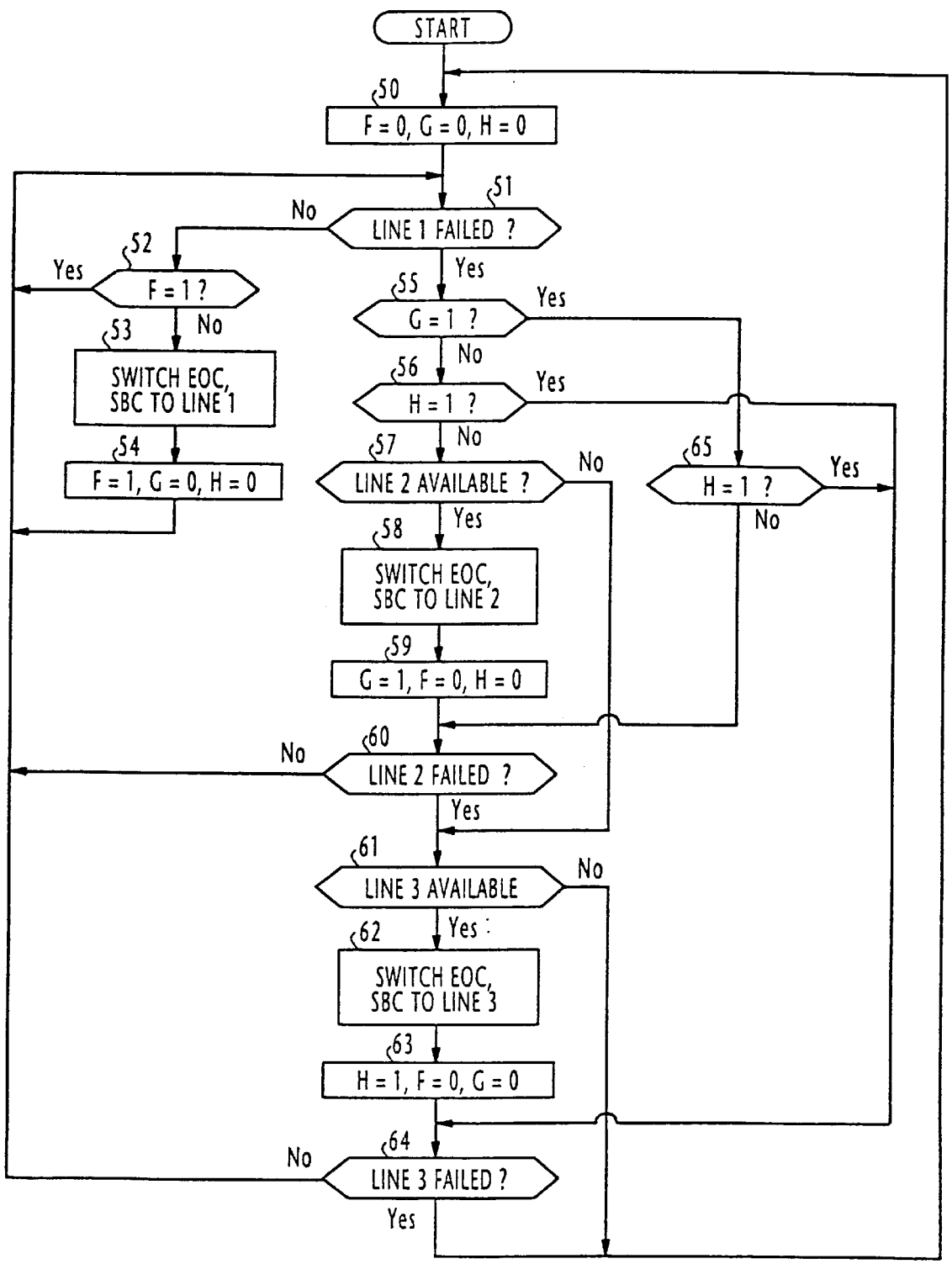
FIG. 3 is a flowchart of the operation of line controllers at the base station and the base station controller in response to an output signal from their line monitors.

In FIG. 3, program execution of controller 12 begins with step 50 where flags F, G and H are set equal to zero, and flow proceeds to step 51 to check to see if a failure has occurred in line 1. If not, flow branches at step 51 to step 52 to check to see if flag F is 1. If not, flow proceeds to step 53 to supply a switching command signal to demultiplexer 11 and multiplexer 24 so that the EOC and SBC signals are both switched to line 1 (see FIG. 2A) and flag F is set to 1 and flags G and H are reset to 0 (step 54) and flow returns to step 51. As long as line 1 is working properly, flow loops steps 51 and 52 to check for the occurrence of a fault in line 1.

Figure 2B:
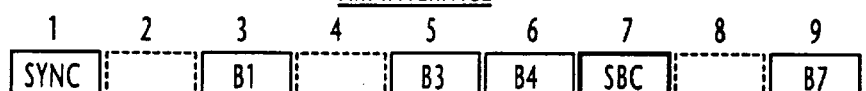

If a failure is detected in line 1, flow exits step 51 and successively executes steps 55 and 56 to check to see if flags G and H are 1. If they are zero, flow proceeds to step 57 to determine the availability of line 2 for carrying the control signals. If the #4 time slot of line 2 carries no payload bits, the decision is affirmative at step 57, and flow proceeds to step 58 to supply a switching command signal to demultiplexer 11 and multiplexer 24 to switch the uplink and downlink EOC and SBC signals from line 1 to line 2, as illustrated in FIG. 2B. Flow proceeds to step 59 to set flag G to 1 and reset flags F and H to 0, indicating that protection switching from line 1 to line 2 has occurred. Controller 12 then executes similar steps on line 2 by checking for the occurrence of a failure in line 2 (step 60). If there is none, flow returns to step 51 to repeat the above process. With G=1 in the presence of failure in line 1, flow proceeds through step 51, branches at step 55 to step 65 to check to see if flag H=1. If H=0, flow proceeds from step 65 to step 60. As long as line 2 is working properly, steps 51 and 60 are repeatedly executed to check for the recovery of line 1 and the occurrence of a failure in line 2. Since F=0, restoration of line 1 causes flow to branch at step 51 to step 52 and thence to step 53 to switch the EOC and SBC signals from line 2 to line 1.

Figure 2C:
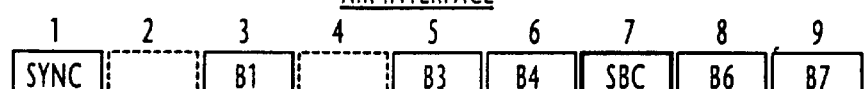

If it is determined at step 57 that line 2 is not available or determined at step 60 that line 2 has failed, flow proceeds to step 61 to determine the availability of line 3. If line 3 is normal, the decision is affirmative at step 61, and flow proceeds to step 62 to supply a switching command signal to demultiplexer 11 and multiplexer 24 to switch the EOC and SBC bits to line 3 (see FIG. 2C). Flow proceeds to step 63 to set flag H to 1 and reset flags F and G to 0, indicating that protection switching from line 1 or 2 to line 3 has occurred. Controller 12 then executes similar steps on line 3 by checking for the occurrence of a failure in line 3 (step 64). If there is none, flow returns to step 51 to repeat the above process. With flag H being set equal to 1, flow proceeds from step 65 to step 64 regardless of the status of flag G. As long as line 3 is working properly, steps 51 and 64 are looped to check for the recovery of line 1 and the occurrence of a failure in line 3.

If it is determined at step 61 that line 3 is not available or determined at step 64 that line 3 has failed, flow returns to step 50 to successively check for the fault recovery and switch the control signals to a line as soon as it is recovered.

Figure 4:
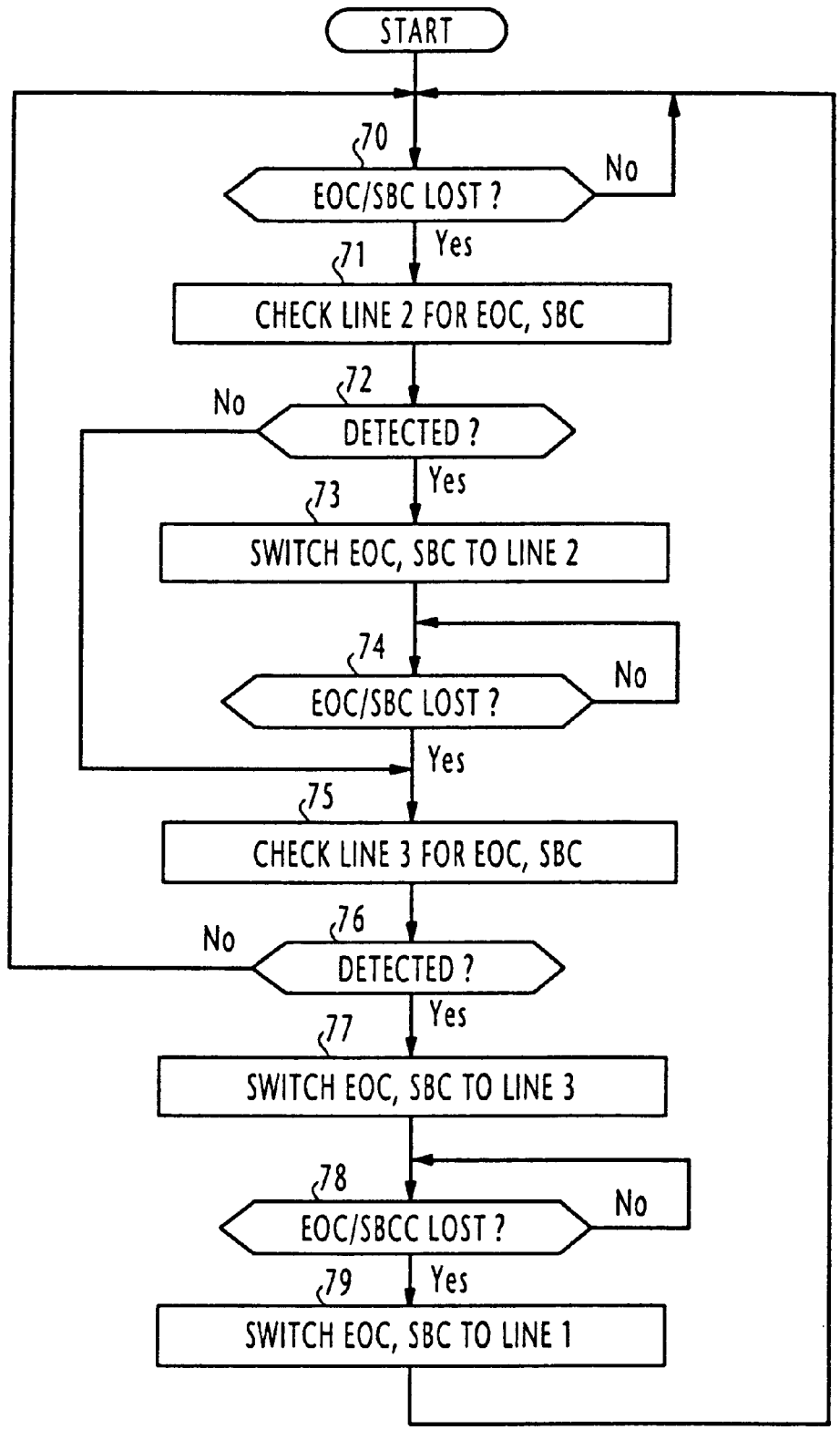
FIG. 4 is a flowchart of the operation of the line controllers in response to an output signal from loss-of-signal detectors.

In FIG. 4, program execution of controller 12 begins with step 70 to determine whether the EOC and SBC control signals are lost from line 1. If so, flow proceeds to step 71 to check line 2 for the presence of the control signals. If the control signals are detected in line 2 (step 72), flow proceeds to step 73 to switch the SBC and EOC control signals to slots #4 and #5 of line 2. Step 74 is then executed to check for the loss of the control signals. If the decision at step 72 is negative or the decision at step is affirmative, flow proceeds to step 75 to check line 3 for the presence of the control signals. If the control signals are detected in line 3 (step 76), flow proceeds to step 77 to switch the SBC and EOC control signals to slots #4 and #5 of line 3. Step 78 is then executed to check for the loss of the control signals. If the decision at step 78 is affirmative, it is determined that line 1 has been restored and flow proceeds to step 79 to switch the control signals to line 1, and flow returns to step 70. If the decision at step 76 is negative due to the absence of the control signals on line 3, it is determined that all transmission lines have failed and flow returns to step 70 to repeatedly check lines 1, 2 and 3 for recovery.

Figure 5:
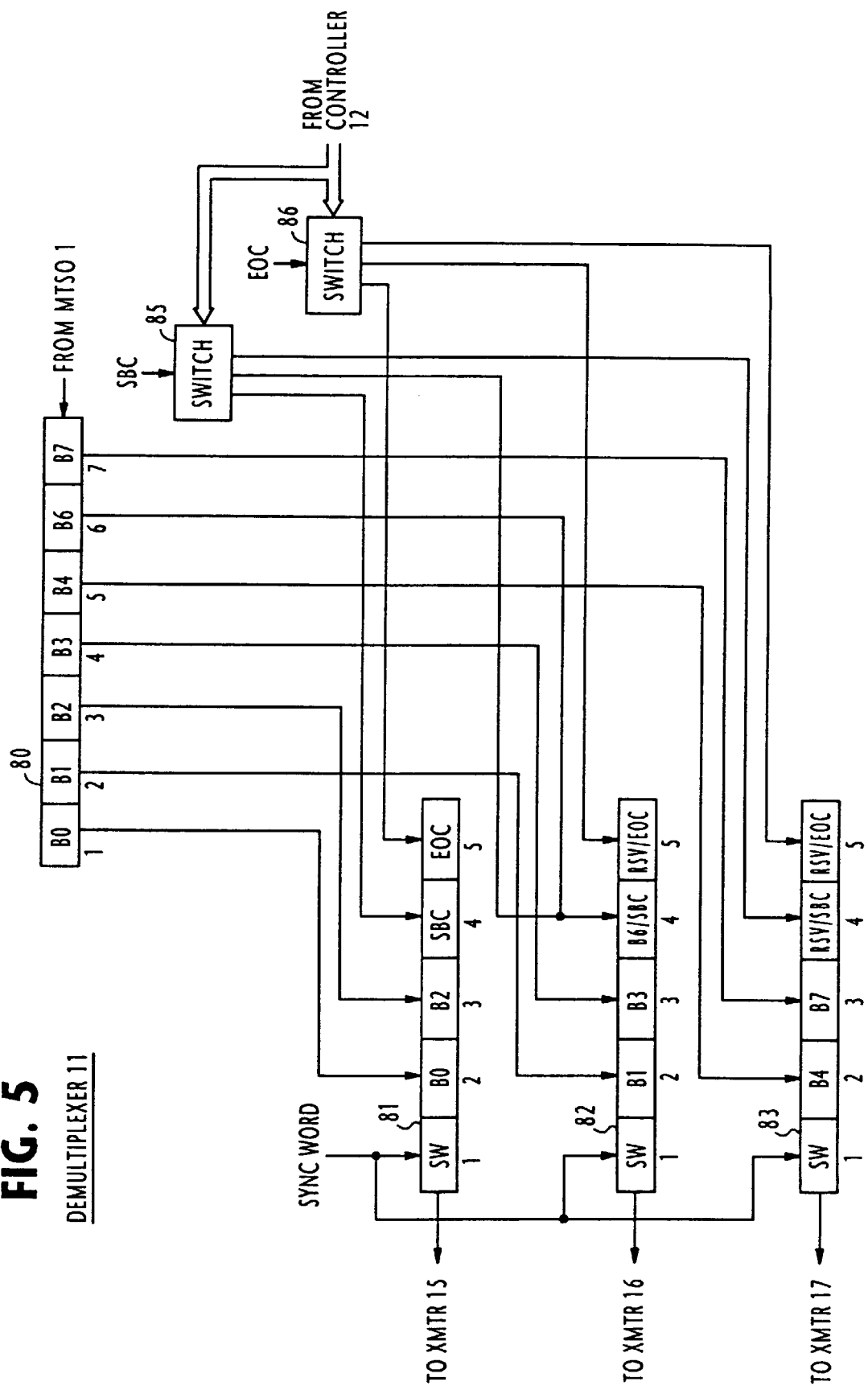
FIG. 5 is a block diagram of the demultiplexer of the base station controller.
Figure 6:
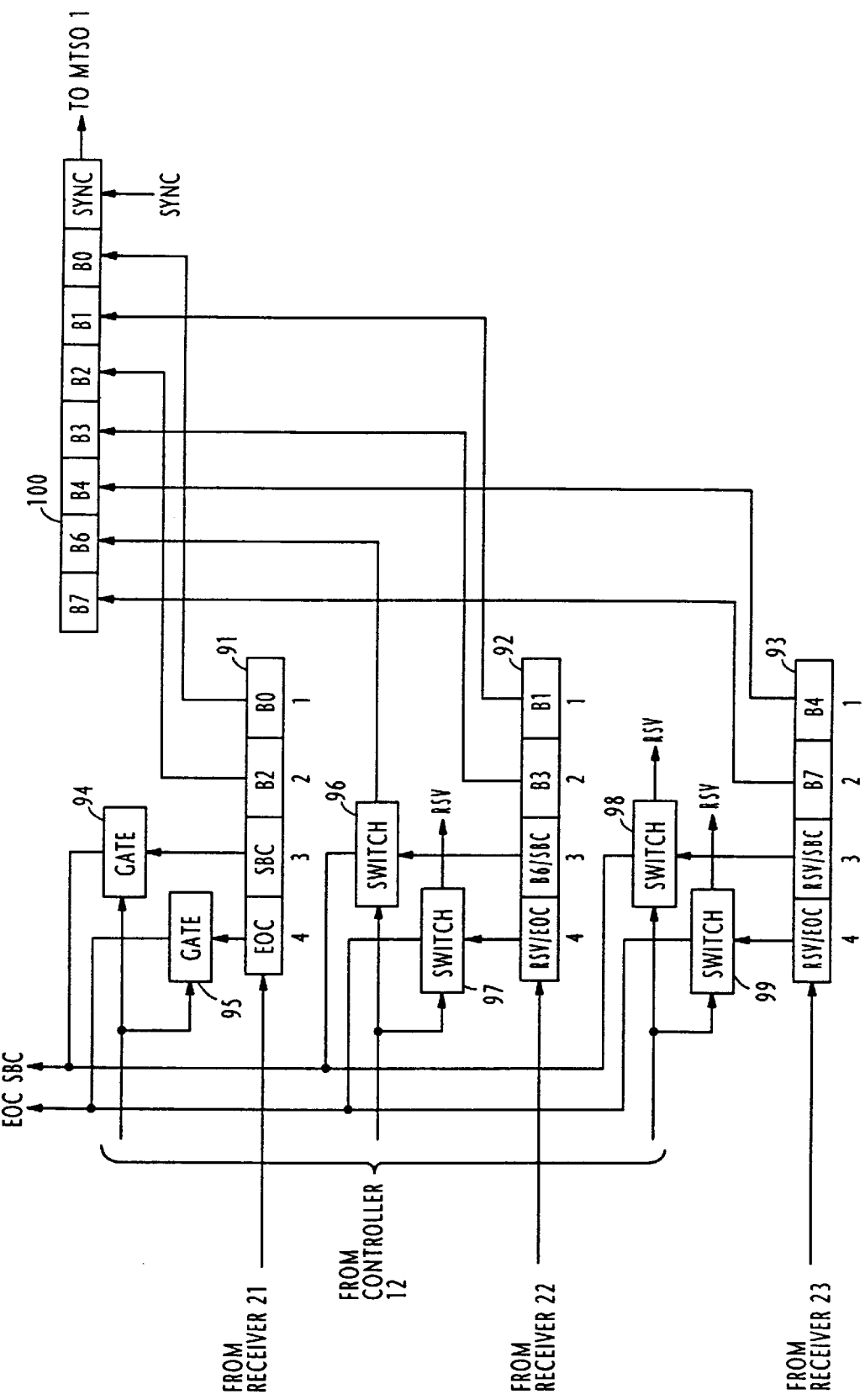
FIG. 6 is a block diagram of the multiplexer of the base station.

Details of demultiplexer 11 and multiplexer 24 at BSC 2 are respectively shown in FIGS. 5 and 6.

In FIG. 5, demultiplexer 11 includes an input shift register 80 and a plurality of output shift registers 81, 82 and 83. The input shift register 80 is partitioned into seven elements for receiving a sequence of payload bits (B0 to B4, B6 and B7) from MTSO 1 and each of the output shift registers is divided into five elements. The first element of each output register is supplied with a sync word and the second and third elements of each output register are supplied with payload bits from the input shift register 80 as illustrated. The SBC and EOC control signals are supplied to switches 85 and 86, respectively. In response to a switching command signal, from controller 12, switch 85 supplies the SBC signal to the fourth element of one of output registers 81, 82, 83 and switch 86 supplies the EOC signal to the fifth element of the output register. The output registers 81, 82 and 83 are connected at their first element to the line transmitters 15, 16 and 17, respectively, to forward the stored signals into the associated transmitters in sequence.

In FIG. 6, multiplexer 24 includes input shift registers 91, 92 and 93 into which the outputs of line receivers 21, 22 and 23 are serially loaded, except for the sync word. The payload bits in the first and second elements of each input register are supplied to an output shift register 100. The third and fourth elements of register 91 are connected to gates 94 and 95 to extract the SBC and EOC control signals in response to a command signal from controller 12 when these control signals are normally carried on line DL-1. Likewise, the contents of the third and fourth elements of register 92 are connected to switches 96 and 97 which respond to a high-level switching command signal for extracting the SBC and EOC and respond to a low-level command signal for coupling payload bits B6 to the output register 100 and extracting a signal which may be present in the fourth element. The third and fourth elements of register 93 are connected to switches 98 and 99 for extracting the SPC and EOC in response to a high-level command signal and for extracting signals (currently reserved) which may be present in response to a low-level command sigal. When filled with payload bits and the sync word, whole contents of the output register 100 are serially shifted out to MTSO 1.

Figure 7:
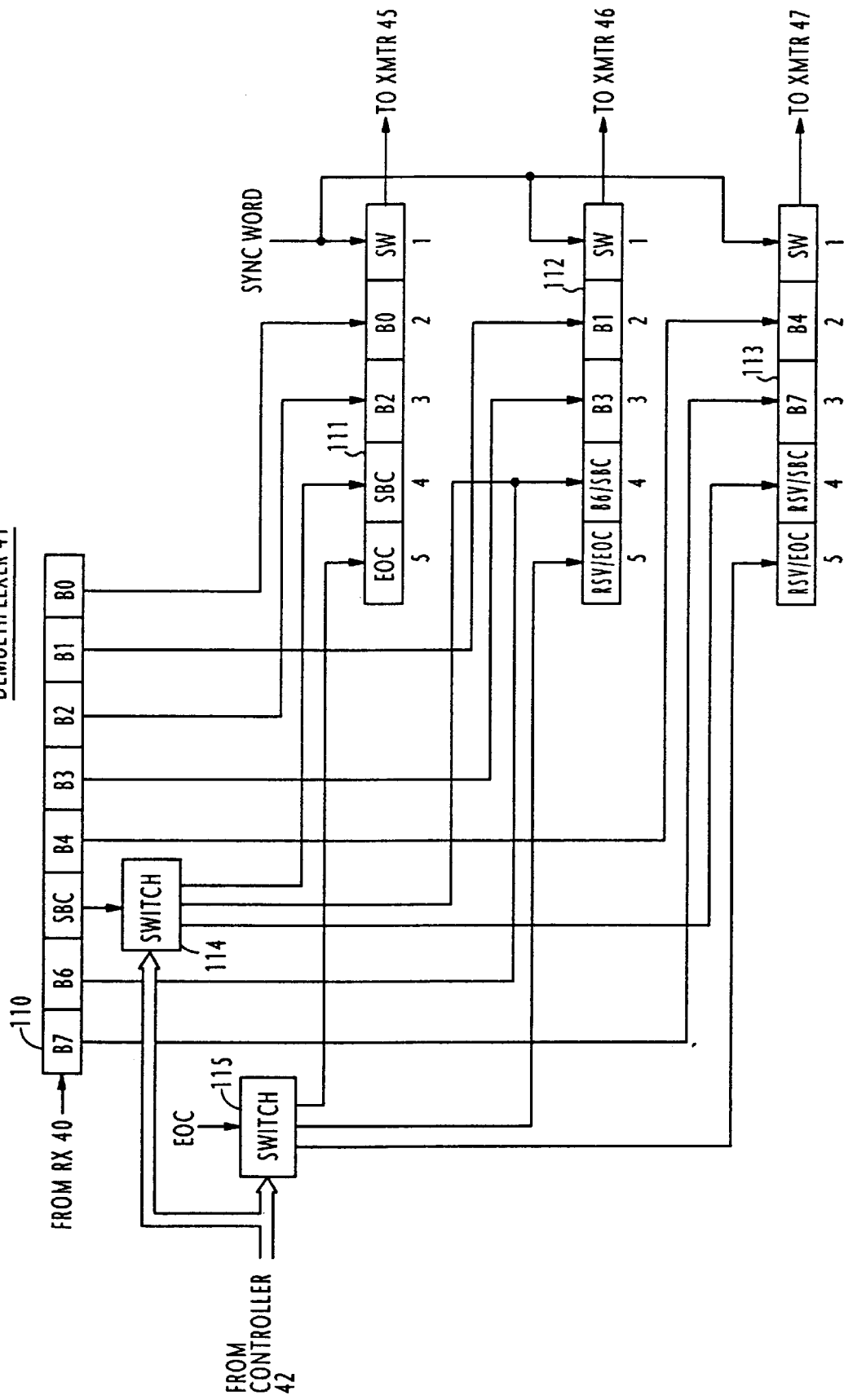
FIG. 7 is a block diagram of the demultiplexer of the base station.
Figure 8:
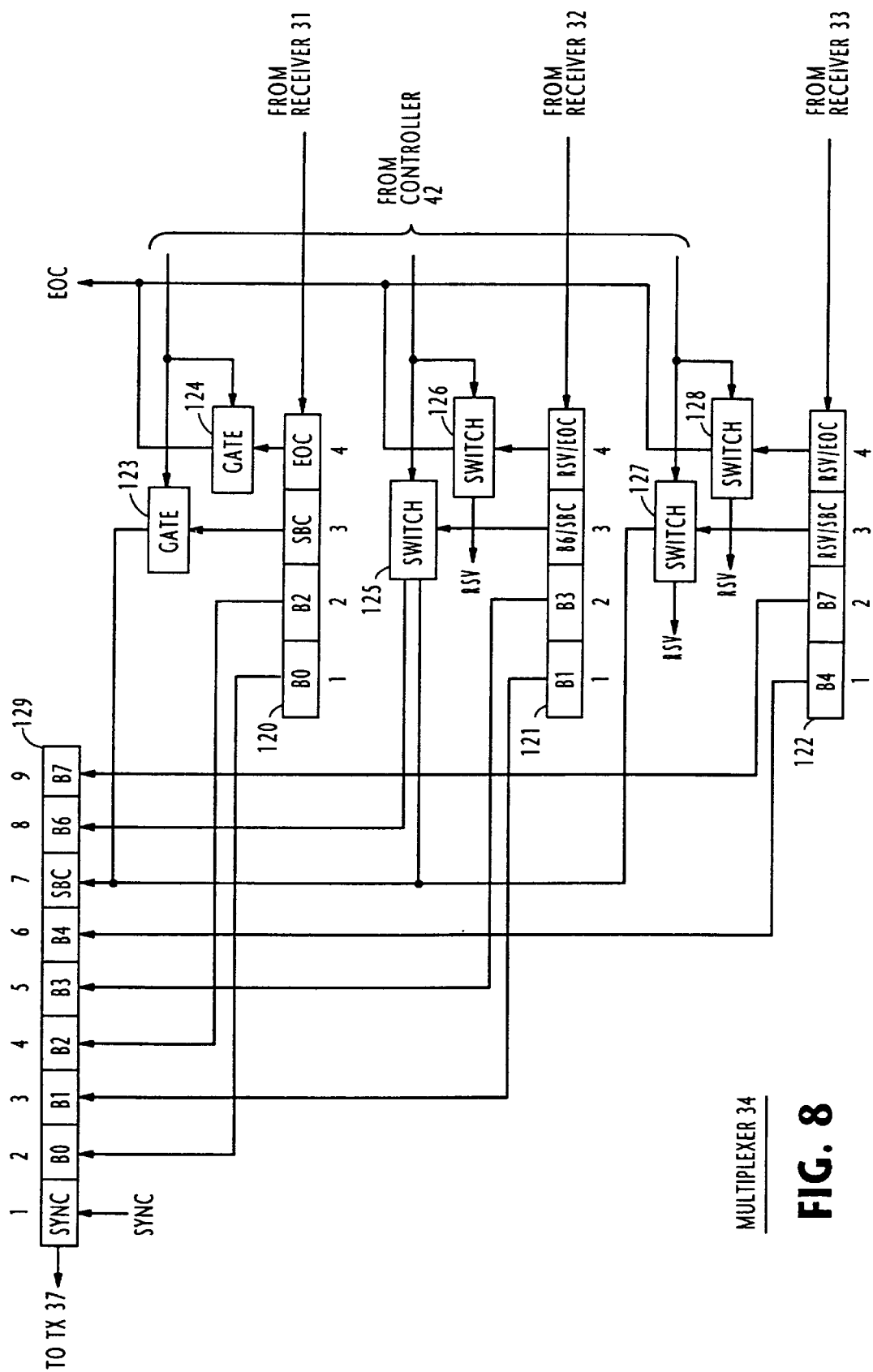
FIG. 8 is a block diagram of the multiplexer of the base station controller.

At the base station, demultiplexer 41 and multiplexer 34 are almost identical to the BSC demultiplexer 11 and multiplexer 24, respectively, as shown in FIGS. 7 and 8. In FIG. 7, the output of radio receiver 40 is applied to an input shift register 110 and payload bits and SBC signal are stored in respective elements of the register as indicated. Except for the SBC signal, payload bits in register 110 are supplied respectively to output shift registers 111, 112 and 113 as illustrated. The first elements of each output register is loaded with a sync word. Switches 114 and 115 are responsive to a command signal from controller 42 for coupling the SBC signal to the fourth element of one of the output registers and coupling the EOC signal to the fifth element of the same output register.

In FIG. 8, the outputs of line receivers 31, 32 and 33 are serially loaded into input shift registers 120, 121 and 122, except for the sync words. The payload bits in the first and second elements of each input shift register are supplied to output shift register 129. The third and fourth elements of register 120 are connected to gates 123 and 124 to transfer the SBC to the seventh element of output register 129 and extract the EOC in response to a command signal from controller 42 when these control signals are normally transmitted on line DL-1. Likewise, the contents of the third and fourth elements of register 121 are connected to switches 125 and 126 which respond to a high-level command signal for transferring the SBC to the output register and extracting the EOC and a low-level command signal for coupling payload bits B6 to the eighth element of output register 129 and extracting a signal which may be present in the fourth element. The contents of the third and fourth elements of register 122 are connected to switches 127 and 128 which respond to a high-level command signal for transferring the SPC to the output register and extracting the EOC and to a low-level command signal for extracting signals (currently reserved) which may be present. The first element of output register 129 is loaded with a sync word. When filled with payload bits, the SBC and the sync word, whole contents of the output register 129 are serially shifted out to the radio transmitter 37.

What is claimed is:

1. A cellular communication system comprising:
a base station controller for transmitting a plurality of downlink TDM signals through a plurality of two-way transmission lines and receiving a plurality of uplink TDM signals from the transmission lines, one of the downlink TDM signals containing downlink cellular control data and one of the uplink TDM signals containing uplink cellular control data, said base station controller including means for monitoring said transmission lines to detect a failure and, upon detection of the failure, providing protection switching of said downlink cellular control data to a vacant time slot of another downlink TDM signal and protection switching of said uplink cellular control data to a vacant time slot of another uplink TDM signal; and a cell-site base station for receiving the downlink TDM signals from the transmission lines and transmitting said plurality of uplink TDM signals to the transmission lines, said base station including means for monitoring said transmission lines to detect a failure and, upon detection of the failure, providing protection switching of said downlink cellular control data to said vacant time slot of said another downlink TDM signal and protection switching of the uplink cellular control data to said vacant time slot of said another uplink TDM signal.

2. A cellular communication system as claimed in claim 1, wherein each of said downlink and uplink cellular control data contains one of a mobile control signal and a maintenance control signal.

3. A cellular communication system as claimed in claim 1, wherein each of the base station controller and the base station further includes means for detecting loss of the cellular control data in the transmission lines and, upon detection of the loss of the cellular control data in one of the transmission lines, providing said protection switching if said means for monitoring had failed to detect said failure in said one of the transmission lines.

4. A cellular communication system as claimed in claim 1, wherein said base station includes a multiplexer for multiplexing the downlink TDM signals into a base-to-mobile TDM signal for transmission to a plurality of mobile stations and a demultiplexer for demultiplexing a mobile-to-base TDM signal from the mobile stations and forwarding said plurality of uplink TDM signals to the transmission lines, and wherein said base station controller includes a demultiplexer for demultiplexing a center-to-base TDM signal from a mobile switching center and forwarding the plurality of downlink TDM signals to the transmission lines and a multiplexer for multiplexing the plurality of uplink TDM signals from the transmission lines and forwarding a base-to-center TDM signal to the mobile switching center.

5. A cellular communication system as claimed in claim 4, wherein the demultiplexer of the base station controller comprises:

a plurality of output registers connected respectively to said transmission lines, each of the output registers having a plurality of successive storage locations corresponding to time slots;

an input register having a plurality of successive storage locations for receiving the center-to-base TDM signal, the storage locations of the input register being uniquely connected to the storage locations of the plurality of said output registers so that signals of respective time slots of said center-to-base TDM signal are stored into said plurality of output registers and respectively forwarded onto said transmission lines as said downlink TDM signals; and means for selectively supplying said downlink cellular control data to one of the output registers, and wherein the multiplexer of the base station controller comprises:

an output register having a plurality of storage locations;

a plurality of input registers connected respectively to said transmission lines, each of the input registers having a plurality of storage locations for respectively storing said uplink TDM signals, the storage locations of each of the input registers being uniquely connected to the storage locations of the output register so that signals of respective time slots of the uplink TDM signals are stored into said output register and serially forwarded to said mobile switching center; and means for selectively detecting said uplink cellular control data in one of the input registers.

6. A cellular communication system as claimed in claim 4, wherein the demultiplexer of the base station comprises:

a plurality of output registers connected respectively to said transmission lines, each of the output registers having a plurality of successive storage locations corresponding to time slots;

an input register having a plurality of successive storage locations for receiving the mobile-to-base TDM signal, the storage locations of the input register being uniquely connected to the storage locations of the plurality of said output registers so that signals of respective time slots of said mobile-to-base TDM signal are stored into said plurality of output registers and respectively forwarded onto said transmission lines as said uplink TDM signals; and means for selectively supplying said uplink cellular control data to one of the output registers, and wherein the multiplexer of the base station comprises:

an output register having a plurality of storage locations;

a plurality of input registers connected respectively to said transmission lines, each of the input registers having a plurality of storage locations for respectively storing said downlink TDM signals, the storage locations of each of the input registers being uniquely connected to the storage locations of the output register so that signals of respective time slots of the downlink TDM signals are stored into said output register and serially forwarded to said mobile stations; and means for selectively detecting said downlink cellular control data in one of the input registers.

7. A cellular communication system as claimed in claim 4, wherein said base station controller further comprises means for making a search through said transmission lines for identifying one of the uplink transmission lines as containing said uplink cellular control data and causing said demultiplexer and multiplexer of the base station controller to provide protection switching of the uplink cellular control data to a specified time slot of the base-to center TDM signal when there is a change in the identified uplink transmission line, and wherein said base station further comprises means for making a search through said transmission lines for identifying one of the downlink transmission lines as containing said downlink cellular control data and causing said demultiplexer and multiplexer of the base station controller to provide protection switching of the downlink cellular control data to a specified time slot of the base-to-mobile TDM signal when there is a change in the identified downlink transmission line.

8. A cellular communication system as claimed in claim 1, wherein each of the base station controller and the base station further includes means for checking the failed transmission line for fault recovery and, if recovered, switching the cellular control data back to said one of the downlink TDM signals and said one of the uplink TDM signals.

9. A cellular communication system comprising:

a cell-site base station for establishing radio communication with a plurality of mobile stations; and a base station controller connected to said base station via a plurality of two-way transmission lines, the base station controller including a demultiplexer for demultiplexing a center-to-base time-division multiplexed (TDM) signal from a mobile switching center and forwarding a plurality of downlink TDM signals to the transmission lines and a multiplexer for multiplexing a plurality of uplink TDM signals from the transmission lines and forwarding a base-to-center TDM signal to the mobile switching center, one of the downlink TDM signals containing downlink cellular control data and one of the uplink TDM signals containing uplink cellular control data;

said base station including a multiplexer for multiplexing the downlink TDM signals into a base-to-mobile TDM signal for transmission to the mobile stations and demultiplexer for demultiplexing a mobile-to-base TDM signal from the mobile stations and forwarding said plurality of uplink TDM signals to the transmission lines;

said base station controller further including means for monitoring said transmission lines to detect a failure and, upon detection of the failure, causing the demultiplexer and multiplexer of the base station controller to provide protection switching of said downlink cellular control data to a vacant time slot of another downlink TDM signal and protection switching of said uplink cellular control data to a vacant time slot of another uplink TDM signal;

said base station further including means for monitoring said transmission lines to detect a failure and, upon detection of the failure, causing the demultiplexer and multiplexer of the base station to provide protection switching of said downlink cellular control data to said vacant time slot of said another downlink TDM signal and protection switching of the uplink cellular control data to said vacant time slot of said another uplink TDM signal.

10. A cellular communication system as claimed in claim 9, wherein each of said downlink and uplink cellular control data contains a mobile control signal and a maintenance control signal.

11. A cellular communication system as claimed in claim 9, wherein said transmission lines comprise a plurality of downlink transmission lines and a plurality of uplink transmission lines, wherein said base station controller further comprises means for making a search through said transmission lines for identifying one of the uplink transmission lines as containing said uplink cellular control data and causing said demultiplexer and multiplexer of the base station controller to provide protection switching of the uplink cellular control data to a specified time slot of the base-to-center TDM signal when there is a change in the identified uplink transmission line, and wherein said base station further comprises means for making a search through said transmission lines for identifying one of the downlink transmission lines as containing said downlink cellular control data and causing said demultiplexer and multiplexer of the base station controller to provide protection switching of the downlink cellular control data to a specified time slot of the base-to-mobile TDM signal when there is a change in the identified downlink transmission line.

12. A cellular communication system as claimed in claim 9, wherein the demultiplexer of the base station controller comprises:

a plurality of output register means connected respectively to said transmission lines, each of the output register means having a plurality of successive storage locations corresponding to time slots;

input register means having a plurality of successive storage locations for receiving the center-to-base TDM signal, the storage locations of the input register means being uniquely connected to the storage locations of the plurality of said output register means so that signals of respective time slots of said center-to-base TDM signal are stored into said plurality of output register means and respectively forwarded onto said transmission lines as said downlink TDM signals; and means for selectively supplying said downlink cellular control data to one of the output register means, and wherein the multiplexer of the base station controller comprises:

output register means having a plurality of storage locations;

a plurality of input register means connected respectively to said transmission lines, each of the input register means having a plurality of storage locations for respectively storing said uplink TDM signals, the storage locations of each of the input register means being uniquely connected to the storage locations of the output register means so that signals of respective time slots of the uplink TDM signals are stored into said output register means and serially forwarded to said mobile switching center; and means for selectively detecting said uplink cellular control data in one of the input register means.

13. A cellular communication system as claimed in claim 1, wherein the demultiplexer of the base station comprises:

a plurality of output register means connected respectively to said transmission lines, each of the output register means having a plurality of successive storage locations corresponding to time slots;

input register means having a plurality of successive storage locations for receiving the mobile-to-base TDM signal, the storage locations of the input register means being uniquely connected to the storage locations of the plurality of said output register means so that signals of respective time slots of said mobile-to-base TDM signal are stored into said plurality of output register means and respectively forwarded onto said transmission lines as said uplink TDM signals; and means for selectively supplying said uplink cellular control data to one of the output register means, and wherein the multiplexer of the base station comprises:

output register means having a plurality of storage locations;

a plurality of input register means connected respectively to said transmission lines, each of the input register means having a plurality of storage locations for respectively storing said downlink TDM signals, the storage locations of each of the input register means being uniquely connected to the storage locations of the output register means so that signals of respective time slots of the downlink TDM signals are stored into said output register means and serially forwarded to said mobile stations; and means for selectively detecting said downlink cellular control data in one of the input register means.

14. A cellular communication system as claimed in claim 9, wherein each of the base station controller and the base station further includes means for checking the failed transmission line for fault recovery and, if recovered, switching the cellular control data back to said one of the downlink TDM signals and said one of the uplink TDM signals.

15. A method of switching transmission paths of downlink and uplink cellular control data in a cellular communication system having a base station controller and a cell-site base station connected by a plurality of transmission links through which a plurality of downlink and uplink TDM signals are transmitted, wherein one of the downlink TDM signals includes said downlink cellular control data and one of the uplink TDM signals includes said uplink cellular control data, said method comprising the steps of:

(a) monitoring the transmission links at both the base station controller and the cell-site base station for failure in the transmission links and for loss of cellular control data;

(b) upon detection of a failure of a transmission link carrying the TDM signal having the downlink cellular control data by the base station controller, transmitting said downlink cellular control data over a vacant time slot of another downlink TDM signal and receiving said uplink cellular control data over a vacant time slot of another uplink TDM signal;

(c) upon detection of a failure of a transmission link carrying the TDM signal having the uplink cellular control data by the cell-site base station, transmitting said uplink cellular control data to said vacant time slot of said another uplink TDM signal and receiving the downlink cellular control data over said vacant time slot of said another downlink TDM signal;

(d) upon detection of loss of uplink cellular data in said transmission link carrying the TDM signal having the downlink cellular control data by the base station controller, transmitting said downlink cellular control data over said vacant time slot of said another downlink TDM signal and receiving said uplink cellular control data over said vacant time slot of said another uplink TDM signal if no failure was detected in step (b);

(e) upon detection of loss of downlink cellular data in said transmission link carrying the TDM signal having the uplink cellular control data by the cell-site base station, transmitting said uplink cellular control data to said vacant time slot of said another uplink TDM signal and receiving the downlink cellular control data over said vacant time slot of said another downlink TDM signal if no failure was detected in step (c).

16. A method as claimed in claim 15, wherein the step of monitoring for loss of cellular control data includes the step of monitoring for loss of one of a mobile control signal and a maintenance control signal.

17. A cellular communication system as claimed in claim 15, further comprising the step of checking the failed transmission line for fault recovery and, if recovered, switching the cellular control data back to said one of the downlink TDM signals and said one of the uplink TDM signals.

18. A cellular communication system comprising:

a base station controller for transmitting a plurality of downlink TDM signals through a plurality of two-way transmission lines and receiving a plurality of uplink TDM signals from the transmission lines, one of the downlink TDM signals containing downlink cellular control data and one of the uplink TDM signals containing uplink cellular control data, the base station controller including a line monitor and a controller to monitor the transmission lines for failure and to switch transmission of the downlink cellular control data to a vacant time slot of another downlink TDM signal and reception of the uplink cellular control data to a vacant time slot of another uplink TDM signal when the failure is detected; and a cell-site base station for receiving the downlink TDM signals from the transmission lines and transmitting the plurality of uplink TDM signals to the transmission lines, the base station including a line monitor and a controller to monitor the transmission lines for failure and to switch reception of the downlink cellular control data to the vacant time slot of said another downlink TDM signal and transmission of the uplink cellular control data to the vacant time slot of said another uplink TDM signal when the failure is detected.

19. A cellular communication system as claimed in claim 18, wherein each of the downlink and uplink cellular control data contains one of a mobile control signal and a maintenance control signal.

20. A cellular communication system as claimed in claim 18, wherein each of the base station controller and the base station further includes a loss of signal detector for detecting loss of the cellular control data in the transmission lines, and wherein, upon detection of the loss of the cellular control data in one of the transmission lines, the controller switches said transmission and reception of the downlink and uplink cellular control data to the vacant time slot of said another downlink and uplink TDM signals, if the line monitor had failed to detect the failure in said one of the transmission lines.

* * * * *